UNITED STATES PATENT OFFICE.

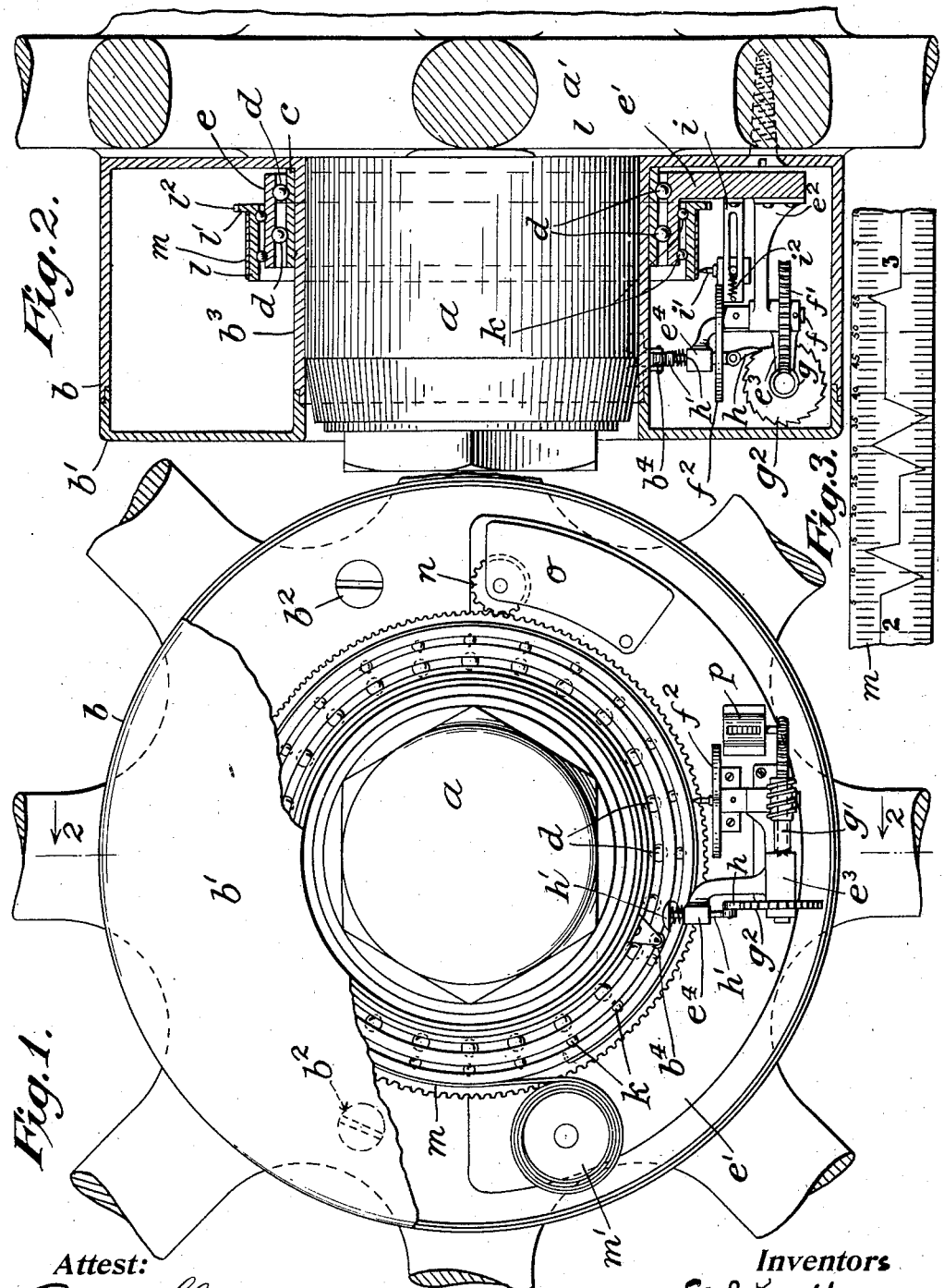

CARL KNOPF AND PAUL KNOPF, OF NEW YORK, N. Y., ASSIGNORS TO KNOPF BROTHERS MANUFACTURING COMPANY, OF NEW YORK, N. Y., A CORPORATION OF NEW YORK.

RECORDING-SPEEDOMETER.

1,097,591.      Specification of Letters Patent.      Patented May 19, 1914.

Application filed January 18, 1913. Serial No. 742,866.

*To all whom it may concern:*

Be it known that we, CARL KNOPF and PAUL KNOPF, citizens of the United States, residing in the borough of Manhattan of the city of New York, in the county of New York, in the State of New York, have invented certain new and useful Improvements in Recording-Speedometers, of which the following is a specification, reference being had to the accompanying drawings, which form a part hereof.

In an application filed by the present applicants on December 26, 1912, Serial No. 738,537 is shown and claimed a recording speedometer mounted on a wheel and operable by the rotation thereof. The type of speedometer to which said application pertains as well as the present invention, is one in which a stylus is oscillated across the face of a moving chart. The speedometer is illustrated in said copending application as mounted in a casing carried on a wheel and positioned eccentrically with relation to the axis of rotation of the wheel.

The present invention relates to a speedometer which, while generally of the same character as that described in the copending application and embodying all of the advantages pointed out with respect thereto, is mounted in a different position on the wheel.

It has for an object to provide a speedometer mounted on and operable by the rotation of a wheel and carried on the hub thereof in a position concentric with the wheel.

It has for a further object to provide in combination with such a recording device a revolution or mileage counter operatively connected to the actuating mechanism of the stylus.

As indicated above, it is thought unnecessary to set forth here all of the advantages accomplished by this general type of speedometer since these advantages are set forth in detail in the copending application above referred to.

The invention will be described more particularly with reference to the accompanying drawings in which—

Figure 1 is a fragmentary view of a hub provided with a recording speedometer constructed in accordance with the present invention, part of the casing of the speedometer being removed in the interest of clearness. Fig. 2 is a sectional view taken on the plane indicated by the line 2—2 of Fig. 1 and showing part of the recording mechanism in elevation. Fig. 3 is a view in plan of a portion of a recording sheet on which is indicated the movement of a vehicle on which the same has been carried.

The hub $a$ of the wheel herein shown may be of any usual form so that recording speedometers manufactured in accordance with the present invention should be made of a size adapted to fit over hubs of standard types and dimensions. The casing $b$ in which the recording mechanism is disposed is annular in form and is adapted to slide on and fit snugly around the hub $a$ of the wheel, as is the lid $b'$ with which it is provided. The casing $b$ may be secured rigidly in position to prevent its movement with respect to the hub $a$, by any suitable fastening means, herein illustrated as screws $b^2$ passing through the rear wall of the casing and entering the enlarged hub portion $a'$ of the wheel. It is to be noted here that the means by which the casing $b$ is secured to the wheel are preferably accessible from the interior of the casing only, so that, if the lid $b'$ be sealed on the casing $b$, it will be impossible for the operator of the vehicle, if the instrument is applied to a vehicle, to remove the case from the wheel and so destroy all evidence of the use of the car.

On the inner wall $b^3$ of the casing $b$ is secured an annular race $c$ which may be provided with grooves on its periphery on which are disposed suitable ball-bearings $d$ of any approved type. Carried on the ball-bearings $d$ is an annular frame $e$ to which is attached or formed integral therewith, a weight $e'$. The weight $e'$ is made in the shape of a segment so that its tendency at all times is to remain in stable equilibrium and in a depending position with respect to the axis of rotation of the wheel. On the outer face of the weight $e'$ may be rigidly secured a bracket $e^2$ in which is journaled a shaft $f$ carrying a worm gear $f'$ in mesh with a worm $g$ which may be carried on a shaft $g'$ journaled in another arm $e^3$ of the bracket $e^2$. Secured to the shaft $g'$ is a ratchet wheel $g^2$ disposed in operative relation to a spring pressed pawl $h$ carried on the end of a spring pressed plunger $h'$. This spring pressed plunger $h'$ may be and preferably is mounted also in a portion $e^4$ of the bracket $e^2$, so that the entire mechanism thus far described is compact and rigid. It will now appear that upon every reciprocation of the spring pressed plunger $h'$ the ratchet wheel $g^2$ will be advanced one tooth by the pawl $h$. Rotation of the ratchet wheel $g^2$ will impart rotation to the shaft $f$, on which is secured a heart shaped cam $f^2$ for a purpose to be described. A second bracket $i$ may be fastened to the outer face of the weight $e'$ and have mounted reciprocably thereon a stylus $i'$. This stylus lies in juxtaposition to the periphery of the heart shaped cam $f^2$ and rotation of the latter with the shaft $f$ imparts a reciprocating movement to the stylus $i'$ against the action of a suitable spring $i^2$ which serves to hold the stylus against the cam. From this description, it will appear that reciprocation of the spring pressed plunger $h'$ will bring about a movement of the stylus $i'$ in the bracket $i$ by coöperation therewith of the cam $f^2$.

On the periphery of the annular frame $e$ which supports the weight $e'$ is formed a race on which are disposed ball-bearings $k$. On these ball-bearings is carried a second annular frame $l$ having an offset or flange portion $l'$, on the periphery of which is formed a gear $l^2$. On the periphery of the frame $l$ may be disposed a suitable graduated recording sheet $m$ extending from a suitable feed drum $m'$ journaled on the face of the weight $e'$. The gear $l^2$ of the frame $l$ is in mesh with a pinion $n$ operatively connected to suitable clock work $o$ of any approved type and which is indicated herein in outline.

By the relation of the parts just described, it will appear that movement of the clock work and rotation of the pinion $n$ brings about a rotation of the chart carrying frame $l$ independently of the weight carrying frame $e$ and the casing $b$ in which the mechanism is disposed.

The stylus $i'$ is disposed operatively with respect to the recording sheet $m$ so that oscillations of the stylus will be recorded thereon and so that, if the sheet is made to travel at a given speed and the stylus makes one oscillation for a given number of revolutions of the wheel, the time of use, speed and duration of use may be ascertained from the sheet in the manner pointed out in the copending application hereinbefore referred to.

To cause the reciprocation of the spring pressed plunger $h'$ a roller $b^4$ is mounted rigidly on the inner wall $b^3$ of the casing $b$ so as to engage the head of said plunger upon each revolution of the casing. As before pointed out, the weight $e'$ is suspended in stable equilibrium and maintains its position, together with the parts thereon mounted by gravity. The casing $b$, however, being rigidly secured to the hub $a$ of the wheel rotates with the wheel and by means of the periodic engagement of the roller $b^4$ with the head of the plunger $h'$ brings about the oscillation of the stylus $i'$ on the face of the chart $m$.

In the present invention, it is proposed to mount on the weight $e'$ a revolution counter or mileage recorder $p$ of any approved mechanical form, and in operative engagement with the worm gear $f'$. By this arrangement an absolutely accurate recordation of the total mileage of the wheel or vehicle may be preserved, while the record for any given period of use may be obtained from the recording sheet.

It is believed that the combination of a recording device comprising a chart and a stylus movable on the face thereof with a mileage recorder in operative connection therewith is new when all of said parts are mounted on a wheel and operated by the rotation thereof. In this arrangement, as well as in the arrangement of a recording speedometer built around the hub of a wheel, resides broadly the present invention, the details of construction fully described herein being susceptible of modification without departing from the spirit of the invention.

We claim as our invention:

1. A recording speedometer comprising an annular casing adapted to be secured about the hub of a wheel concentric therewith, a weight mounted in said casing so as to be relatively revoluble therein about the axis of the casing, clock driven means within the casing for supporting a record sheet, a marker movable across the face of the record sheet and supported in a relatively stationary position with respect to the record sheet, and means actuated by the rotation of the casing to actuate the marker.

2. A recording speedometer comprising an annular casing adapted to be secured about the hub of a wheel concentric therewith, a weight mounted in said casing so as to be relatively revoluble therein about the axis of the casing, clock driven means concentric with the casing for supporting a record sheet, a marker movable transversely across the record sheet and supported in a relatively stationary position with respect to the length of the record sheet, and means actuated by the rotation of the casing to shift the marker transversely.

3. A recording speedometer including a record sheet, means to move the same, a marker mounted in operative position with respect thereto, a weight suspended concentrically with respect to the axis of rotation of a wheel, means carried on said wheel to support the weight, and means mounted on the weight and actuated by the rotation of the wheel to oscillate the marker across the face of the sheet.

4. A recording speedometer including a record sheet, a marker mounted in operative position with respect thereto, a cam in operative engagement with the marker to oscillate the same, means to rotate the cam including a weight pivotally suspended in stable equilibrium, a casing in which all of said parts are disposed and means to mount the casing outside of and around the hub of a wheel so that the weight is concentric with the axis of the wheel, and whereby bodily movement of the casing and rotation thereof with respect to the weight is caused by the revolution of the wheel.

5. A recording speedometer including an annular casing, a weight pivotally suspended therein in stable equilibrium, means to mount the casing outside of and around the hub of a wheel, the weight being concentric with the axis thereof whereby revolutions of the wheel will cause rotation of the casing with respect to the weight, a record sheet, a marker mounted in operative position therewith on the weight, and means operable by the relative rotation of the casing and the weight to move the marker.

6. A recording speedometer including an annular casing mounted on the hub of a wheel, an annular frame bearing on the inner wall of the casing and freely movable with respect thereto, a weighty segment suspended from said frame in stable equilibrium and concentric to the axis of the wheel, a record sheet mounted in said casing, means to move the same, a marker carried on the weight and in operative position with respect to the record sheet, a reciprocatory plunger mounted on the weight and operatively connected to the marker, and means carried on the casing to reciprocate said plunger upon the revolution of the wheel.

7. A recording speedometer including an annular casing mounted on the hub of a wheel, an annular frame bearing on the inner wall of the casing and freely movable with respect thereto, a weighty segment suspended from said frame in stable equilibrium and concentric to the axis of the wheel, a second annular frame bearing on the first named frame and freely movable with respect thereto, means mounted on the weight to move said frame at a constant speed, a record sheet disposed on the periphery of said frame, a marker mounted on the weight in operative position with respect to the sheet, a reciprocatory plunger carried on the weight and in operative connection with the marker, and means rotatable with the casing to reciprocate said plunger upon the revolution of the wheel.

8. The combination of a recording speedometer carried on a wheel and operable by the rotation thereof including a record sheet and a marker operatively disposed with respect thereto, a revolution counter carried on the wheel and operatively connected to said marker and actuated simultaneously therewith, and a weight disposed outside of and around the hub of a wheel to operate the marker and the revolution counter, the weight being suspended concentrically with respect to the axis of rotation of the wheel.

9. The combination of a recording speedometer carried on a wheel and operable by the rotation thereof including a record sheet and a marker operatively disposed with respect thereto, a weight disposed outside of and around the hub of a wheel, a revolution counter mounted on the weight, and means operatively connecting the marker and the revolution counter with the weight whereby the latter operates the marker and the revolution counter simultaneously when the wheel rotates.

This specification signed and witnessed this 15th day of January A. D., 1913.

CARL KNOPF.
PAUL KNOPF.

Signed in the presence of—
E. M. TAYLOR,
WORTHINGTON CAMPBELL.

Copies of this patent may be obtained for five cents each, by addressing the "Commissioner of Patents, Washington, D. C."